US012586905B2

(12) United States Patent
Wang et al.

(10) Patent No.: US 12,586,905 B2
(45) Date of Patent: Mar. 24, 2026

(54) ANTENNA AND METHOD FOR MANUFACTURING THE SAME, AND ANTENNA SYSTEM

(71) Applicants: Beijing BOE Technology Development Co., Ltd., Beijing (CN); BOE TECHNOLOGY GROUP CO., LTD., Beijing (CN)

(72) Inventors: Feng Wang, Beijing (CN); Jian Zhou, Beijing (CN); Yafei Zhang, Beijing (CN); Feng Qu, Beijing (CN)

(73) Assignees: Beijing BOE Technology Development Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 824 days.

(21) Appl. No.: 17/637,546

(22) PCT Filed: Apr. 29, 2021

(86) PCT No.: PCT/CN2021/091110

§ 371 (c)(1),
(2) Date: Jun. 23, 2023

(87) PCT Pub. No.: WO2022/226918

PCT Pub. Date: Nov. 3, 2022

(65) Prior Publication Data

US 2024/0047878 A1 Feb. 8, 2024

(51) Int. Cl.
*H01Q 1/38* (2006.01)
*H01Q 1/48* (2006.01)
*H01Q 9/04* (2006.01)

(52) U.S. Cl.
CPC ............ *H01Q 9/0407* (2013.01); *H01Q 1/38* (2013.01); *H01Q 1/48* (2013.01)

(58) Field of Classification Search
CPC .......... H01Q 9/0407; H01Q 1/38; H01Q 1/48
See application file for complete search history.

(56) References Cited

U.S. PATENT DOCUMENTS 6,002,368 A 12/1999 Faraone et al.
2003/0197647 A1 10/2003 Waterman
(Continued)

FOREIGN PATENT DOCUMENTS

CN 103259095 A 8/2013
CN 103515701 A 1/2014
(Continued)

OTHER PUBLICATIONS

Chao Sun:"A Design of Low Profile Microstrip Patch Antenna With Bandwidth Enhancement", vol. 8. 2020, IEEE Access.
(Continued)

*Primary Examiner* — Henry Luong
(74) *Attorney, Agent, or Firm* — HOUTTEMAN LAW LLC

(57) ABSTRACT

The present disclosure provides an antenna, a method for manufacturing an antenna and an antenna system. The antenna according to the present disclosure includes: a dielectric layer having a first surface and a second surface which are oppositely disposed along a thickness direction of the dielectric layer; a radiation patch disposed on the first surface of the dielectric layer; and a reference electrode layer disposed on the second surface of the dielectric layer and having an orthographic projection on the second surface at least partially overlapping an orthographic projection of the radiation patch on the second surface. The reference electrode layer has an opening penetrating therethrough along a thickness direction of the reference electrode layer, and an orthographic projection of at least a part of a radiation edge
(Continued)

of the radiation patch on the first surface is located within an orthographic projection of the opening on the first surface.

20 Claims, 10 Drawing Sheets

(56) References Cited

U.S. PATENT DOCUMENTS

| | | | | |
|---|---|---|---|---|
| 2004/0189532 | A1* | 9/2004 | Nakano | H01Q 1/40 343/700 MS |
| 2009/0051620 | A1 | 2/2009 | Ishibashi | |

FOREIGN PATENT DOCUMENTS

| | | | | | |
|---|---|---|---|---|---|
| CN | 103515711 | A | | 1/2014 | |
| CN | 103531901 | A | | 1/2014 | |
| CN | 104852158 | A | | 8/2015 | |
| CN | 107230840 | A | | 10/2017 | |
| CN | 207426160 | U | | 5/2018 | |
| CN | 108493592 | A | | 9/2018 | |
| CN | 108847521 | A | | 11/2018 | |
| CN | 109768380 | A | | 5/2019 | |
| CN | 110534883 | A | | 12/2019 | |
| CN | 110829015 | A | * | 2/2020 | H01Q 1/48 |
| CN | 110870138 | A | | 3/2020 | |
| CN | 210984953 | U | | 7/2020 | |
| CN | 111740217 | A | | 10/2020 | |
| CN | 111969333 | A | | 11/2020 | |
| JP | 2006000745 | A | | 1/2006 | |

OTHER PUBLICATIONS

Chen Ding:"An Optically Transparent Dual-Polarized Stacked Patch Antenna with Metal-Mesh Films", IEEE Antennas and Wireless Propagation Letters, vol. 18, No. 10, Oct. 2019.

Boyu Zheng:"Effect of a finite ground plane on microstrip-fed cavity-backed slot antennas", IEEE Transactions on Antennas and Propagation, vol. 53, No. 2, Feb. 2005.

Changjiang Deng:"Low-profile circularly polarised patch-ring antenna with compact feeding network", IET Microwaves, Antennas & Propagation, vol. 12, Iss. 3, 2018.

Huixian Wu:"Research on Millimeter-Wave Microstrip Rectangular Slot Antenna for Circular Polarization", Jun. 2012.

* cited by examiner

ANTENNA AND METHOD FOR MANUFACTURING THE SAME, AND ANTENNA SYSTEM

TECHNICAL FIELD

The present disclosure belongs to the field of communication technology, and in particular, relates to an antenna, a method for manufacturing an antenna and an antenna system.

BACKGROUND

In mobile terminals such as mobile phones, laptops and tablet computers, and in wireless applications such as micro-satellites, smart windows and intelligent wearable devices, miniaturization and thinning of antennas have become a trend. The thinning of antennas is beneficial to realizing a conformal structure design and reducing weights of antennas. An important aspect of thinning of an antenna is to lower a profile of the antenna. Therefore, how to lower the profile of the antenna is a technical problem to be solved urgently.

SUMMARY

To solve at least one technical problem in the prior art, the present disclosure provides an antenna, a method for manufacturing an antenna and an antenna system.

In a first aspect, an embodiment of the present disclosure provides an antenna, including:

- a dielectric layer having a first surface and a second surface which are oppositely disposed along a thickness direction of the dielectric layer;
- a radiation patch disposed on the first surface of the dielectric layer; and
- a reference electrode layer disposed on the second surface of the dielectric layer and at least partially overlapping an orthographic projection of the radiation patch on the second surface; where
- the reference electrode layer has an opening penetrating therethrough along a thickness direction of the reference electrode layer, and an orthographic projection of at least a part of a radiation edge of the radiation patch on the first surface is located within an orthographic projection of the opening on the first surface.

In some implementations, the reference electrode layer has a middle area and a peripheral area surrounding the middle area; the opening penetrates through at least a part of a boundary line between the middle area and the peripheral area; an orthographic projection of the radiation patch on the first surface covers an orthographic projection of the middle area of the reference electrode layer on the first surface; and

- the reference electrode layer includes a first hollow out pattern in the middle area and a second hollow out pattern in the peripheral area; and the radiation patch includes a third hollow out pattern.

In some implementations, orthographic projections of hollow out parts of the first hollow out pattern on the first surface completely overlap orthographic projections of hollow out parts of the third hollow out pattern on the first surface.

In some implementations, the radiation patch includes a first radiation edge and a second radiation edge, which each extend along a first direction and are arranged side by side along a second direction; the opening includes a first opening and a second opening, which each extend along the first direction and are arranged side by side along the second direction; an orthographic projection of the first radiation edge on the dielectric layer penetrates through an orthographic projection of the first opening on the dielectric layer; and an orthographic projection of the second radiation edge on the dielectric layer penetrates through an orthographic projection of the second opening on the dielectric layer.

In some implementations, a length of the first opening is not less than a length of the first radiation edge; and/or a length of the second opening is not less than a length of the second radiation edge.

In some implementations, the first hollow out pattern includes a plurality of first metal lines, which each extend along a third direction and are arranged side by side along the first direction, and gaps between the first metal lines define the hollow out parts of the first hollow out pattern;

- the second hollow out pattern includes a plurality of second metal lines, which each extend along the third direction and are arranged side by side along the first direction, and gaps between the second metal lines define hollow out parts of the second hollow out pattern; and
- the third hollow out pattern includes a plurality of third metal lines, which each extend along the third direction and are arranged side by side along the first direction, and gaps between the third metal lines define the hollow out parts of the third hollow out pattern.

In some implementations, a distance between any two adjacent ones of the first metal lines is the same as a distance between any two adjacent ones of the second metal lines; and an orthographic projection of each of the first metal lines on the dielectric layer is covered by an orthographic projection of an extension line of one of the second metal lines on the dielectric layer.

In some implementations, the first direction is the same as the third direction.

In some implementations, the first hollow out pattern further includes a plurality of fourth metal lines intersecting the first metal lines, and the fourth metal lines each extend along a fourth direction and are arranged side by side along the second direction; and the third hollow out pattern further includes a plurality of fifth metal lines intersecting the third metal lines, and the fifth metal lines each extend along the fourth direction and are arranged side by side along the second direction.

In some implementations, the fourth direction is the same as the second direction.

In some implementations, the second hollow out pattern further includes a plurality of sixth metal lines intersecting the first metal lines, and the sixth metal lines each extend along the fourth direction and are arranged side by side along the second direction.

In some implementations, the radiation patch further includes a third radiation edge and a fourth radiation edge, which each extend along the second direction and are arranged side by side along the first direction; the opening further includes a third opening and a fourth opening, which each extend along the second direction and are arranged side by side along the first direction; an orthographic projection of the third radiation edge on the dielectric layer penetrates through an orthographic projection of the third opening on the dielectric layer; and an orthographic projection of the fourth radiation edge on the dielectric layer penetrates through an orthographic projection of the fourth opening on the dielectric layer.

In some implementations, a length of the third opening is not less than a length of the third radiation edge; and/or a length of the fourth opening is not less than a length of the fourth radiation edge.

In some implementations, the reference electrode layer and the radiation patch each are circular or oval in profile;

the reference electrode layer includes a plurality of seventh metal lines concentrically arranged in circles and a plurality of eighth metal lines radiating from a center of the reference electrode layer to an edge of the reference electrode layer, at least a portion of the eighth metal lines each are disconnected at positions of the seventh metal lines to define the opening; and the radiation patch includes a plurality of ninth metal lines concentrically arranged in circles and a plurality of tenth metal lines radiating from a center of the radiation patch to an edge of the radiation patch.

In some implementations, the opening includes a first opening and a second opening; and the first opening and the second opening forms a centrosymmetric pattern.

In some implementations, the reference electrode layer further includes a filling medium filled in the opening.

In some implementations, the filling medium includes silicon or aluminum oxide.

In some implementations, the dielectric layer includes a first dielectric sub-layer, a first adhesive layer, a second dielectric sub-layer, a second adhesive layer and a third dielectric sub-layer, which are sequentially stacked, a surface of the third dielectric sub-layer away from the second adhesive layer serves as the first surface of the dielectric layer, and a surface of the first dielectric sub-layer away from the first adhesive layer serves as the second surface of the dielectric layer.

In some implementations, the dielectric layer includes a first dielectric sub-layer, a first adhesive layer, a second dielectric sub-layer, a second adhesive layer and a third dielectric sub-layer, which are sequentially stacked, a surface of the third dielectric sub-layer close to the second adhesive layer serves as the first surface of the dielectric layer, and a surface of the first dielectric sub-layer close to the first adhesive layer serves as the second surface of the dielectric layer.

In some implementations, materials of the first dielectric sub-layer and third dielectric sub-layer each include polyimide, and a material of the second dielectric sub-layer includes polyethylene terephthalate.

In some implementations, a width of the opening is more than 5 times a thickness of the dielectric layer.

In a second aspect, an embodiment of the present disclosure provides a method for manufacturing an antenna, including:

providing a dielectric layer;

forming a pattern including a reference electrode layer on a second surface of the dielectric layer by a patterning process, wherein an opening is formed in the reference electrode layer; and forming a pattern including a radiation patch on a first surface of the dielectric layer by a patterning process, wherein an orthographic projection of at least a part of a radiation edge of the radiation patch on the first surface is located within an orthographic projection of the opening on the first surface.

In some implementations, the dielectric layer includes a first dielectric sub-layer, a first adhesive layer, a second dielectric sub-layer, a second adhesive layer and a third dielectric sub-layer, which are sequentially stacked; and the method includes:

providing the first dielectric sub-layer;

forming the pattern including the reference electrode layer on the first dielectric sub-layer by a patterning process;

coating the first adhesive layer on a side of the first dielectric sub-layer away from the reference electrode layer, forming the second dielectric sub-layer on the first adhesive layer, forming the second adhesive layer on a surface of the second dielectric sub-layer away from the first adhesive layer, and forming the third dielectric sub-layer on the second adhesive layer; and forming the pattern including the radiation patch on the third dielectric sub-layer by a patterning process.

In some implementations, the dielectric layer includes a first dielectric sub-layer, a first adhesive layer, a second dielectric sub-layer, a second adhesive layer and a third dielectric sub-layer, which are sequentially stacked; and the method includes:

providing the first dielectric sub-layer;

forming the pattern including the reference electrode layer on the first dielectric sub-layer by a patterning process;

providing the third dielectric sub-layer;

forming the pattern including the radiation patch on the third dielectric sub-layer by a patterning process; and providing the second dielectric sub-layer, bonding a side of the first dielectric sub-layer, on which the reference electrode layer is formed, to the second dielectric sub-layer by the first adhesive layer, and bonding a side of the third dielectric sub-layer, on which the radiation patch is formed, to the second dielectric sub-layer.

In a third aspect, an embodiment of the present disclosure provides an antenna system, including at least the antenna described above.

In some implementations, the antenna system further includes:

a transceiving element configured to transmit or receive a signal;

a radio frequency transceiver connected to the transceiving element, and configured to modulate a signal transmitted from the transceiving element or configured to demodulate a signal received by the antenna and then transmit the signal demodulated to the transceiving element;

a signal amplifier connected to the radio frequency transceiver, and configured to increase a signal-to-noise ratio of the signal output by the radio frequency transceiver or the signal received by the antenna;

a power amplifier connected to the radio frequency transceiver, and configured to amplify power of the signal output by the radio frequency transceiver or the signal received by the antenna; and a filtering element connected to the signal amplifier, the power amplifier and the antenna, and configured to filter a signal received and then transmit the signal filtered to the antenna or configured to filter the signal received by the antenna.

DETAIL DESCRIPTION OF EMBODIMENTS

In order to enable those skilled in the art to better understand the technical solutions of the present disclosure, the present disclosure is further described in detail below with reference to the drawings and the specific implementations.

Unless otherwise defined, technical terms or scientific terms used in the present disclosure should have general meanings that can be understood by those of ordinary skill in the art. The words "first", "second" and the like used in the present disclosure do not denote any order, quantity, or importance, but are merely used to distinguish between different elements. Similarly, the word "a", "an", "the" or the like does not denote limitation on quantity, but denotes "at least one". The word "include", "comprise" or the like indicates that an element or object before the word covers elements or objects or the equivalents thereof listed after the word, but does not exclude other elements or objects. The word "connect", "couple" or the like is not restricted to physical or mechanical connection, but may include electrical connection, whether direct or indirect. The words "on", "under", "left", "right" and the like are merely used to indicate relative positional relationships, and when an absolute position of an object described is changed, the relative positional relationships may be changed accordingly.

Figure 1:
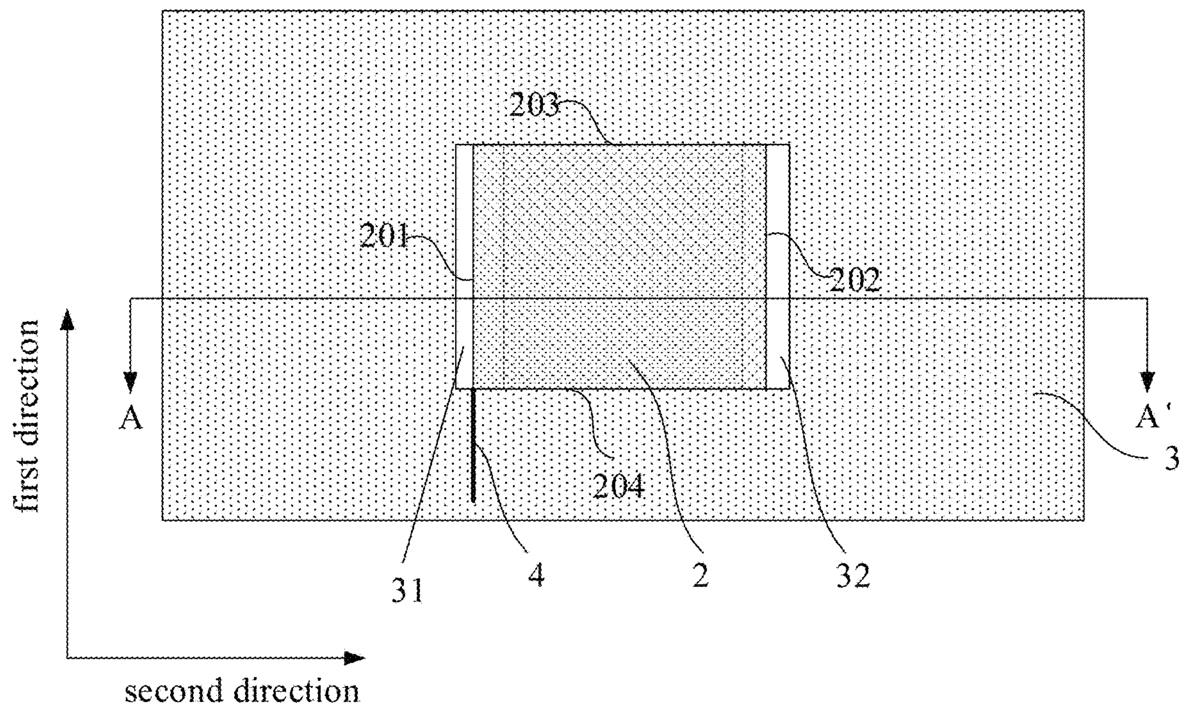
FIG. 1 is a top view of a film antenna according to an embodiment of the present disclosure.
Figure 2:
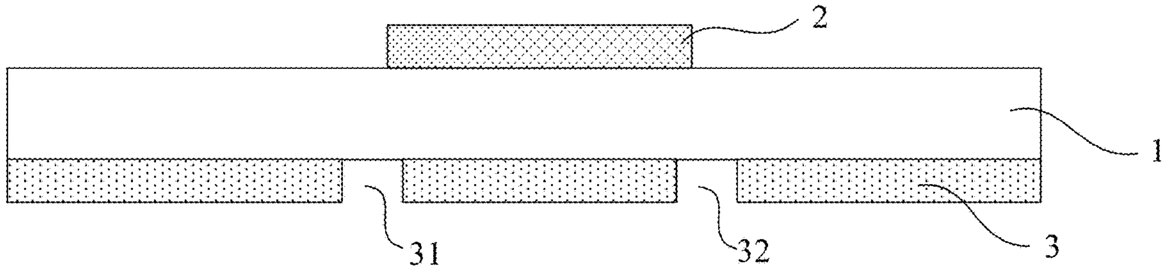
FIG. 2 is a sectional view of the film antenna in FIG. 1 taken along a line A-A'.

In a first aspect, FIG. 1 is a top view of a film antenna according to an embodiment of the present disclosure; and FIG. 2 is a sectional view of the film antenna in FIG. 1 taken along a line A-A'. As shown in FIG. 1 and FIG. 2, an embodiment of the present disclosure provides a film antenna, including a dielectric layer 1, a radiation patch 2, a reference electrode layer and a feeder line 4. The dielectric layer 1 includes a first surface (an upper surface) and a second surface (a lower surface) which are oppositely disposed along a thickness direction of the dielectric layer 1. The radiation patch 2 and the feeder line 4 are disposed on the first surface of the dielectric layer 1, the feeder line 4 is connected to the radiation patch 2, and the reference electrode layer is disposed on the second surface of the dielectric layer 1. In the embodiment of the present disclosure, the reference electrode layer has an opening therein, an orthographic projection of the radiation patch 2 on the dielectric layer 1 at least partially overlaps an orthographic projection of the reference electrode layer on the dielectric layer 1, and an orthographic projection of at least a part of a radiation edge of the radiation patch 2 on the dielectric layer 1 is located within an orthographic projection of the opening on the first surface.

It should be noted that, in the embodiment of the present disclosure, the reference electrode layer includes, but is not limited to, a ground layer 3, that is, a signal applied to the reference electrode layer is a ground signal. In the embodiment of the present disclosure, it is described by taking the reference electrode layer being the ground layer 3 as an example. It should be understood that, as long as voltages actually on the reference electrode layer and the radiation patch can form a loop when the film antenna operates, the ground layer 3 being selected as the reference electrode layer is not intended to limit the protection scope of the embodiment of the present disclosure. In addition, the radiation edge of the radiation patch 2 in the embodiment of the present disclosure refers to a side edge of the radiation patch 2, for example, when the radiation patch 2 has a rectangular contour, four side edges of the rectangular radiation patch 2 are radiation edges.

Figure 5:
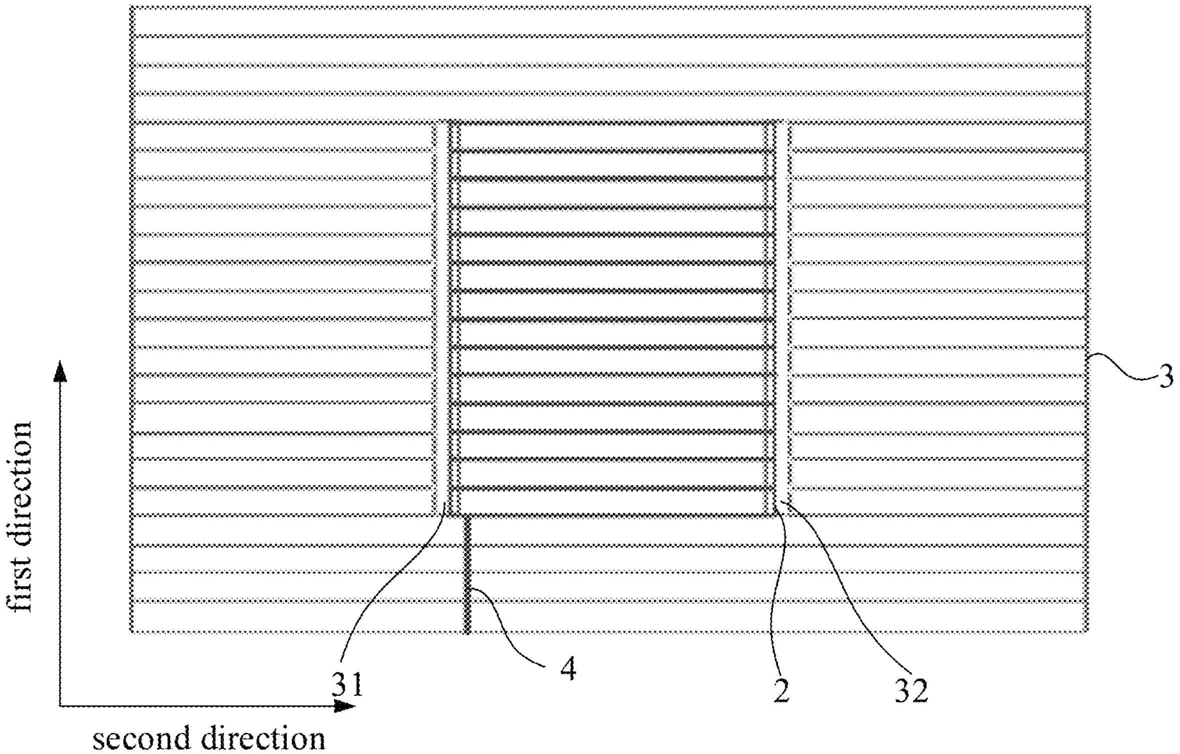
FIG. 5 is a top view of a ground layer of the film antenna shown in FIG. 1.

In the film antenna provided by the embodiment of the present disclosure, as shown in FIG. 5, the ground layer 3 is provided with an opening therein, and the orthographic projection of at least a part of the radiation edge of the radiation patch 2 on the dielectric layer 1 is located within an orthographic projection of the opening on the dielectric layer 1. With such arrangement of the opening, a profile of the film antenna can be lowered, thereby improving radiation efficiency of the thin antenna.

In some examples, the opening is filled with a filling medium, and the filling medium is a high dielectric constant material corresponding to a microwave band or a millimeter wave band, such as silicon, aluminium oxide, certain ceramic materials, and the like. If the opening is not filled with the high dielectric constant material, the radiation efficiency can be improved by 4 to 5 times compared with that of a conventional patch antenna with a low profile; and if the opening is filled with the high dielectric constant material, the radiation efficiency can be improved by about 6 to 8 times, and a radiation bandwidth (with the radiation efficiency of 30%) is also increased to more than 15%.

In some examples, materials of the radiation patch 2, the feeder line 4 and the ground layer 3 may be the same, for example, each may be at least one of copper (Cu), aluminum (Al), molybdenum (Mo) and silver (Ag). In the embodiment of the present disclosure, it is described by taking the materials of the radiation patch 2, the feeder line 4 and the ground layer 3 being copper as an example.

In some examples, the dielectric layer 1 in the antenna may have a single-layer structure or a composite-layer structure. As shown in FIG. 2, when the dielectric layer 1 has a single-layer structure, the material of the dielectric layer 1 includes, but is not limited to, a flexible material, for example, the dielectric layer 1 may use a Polyimide (PI) material or a polyethylene terephthalate (PET) material.

Figure 3:
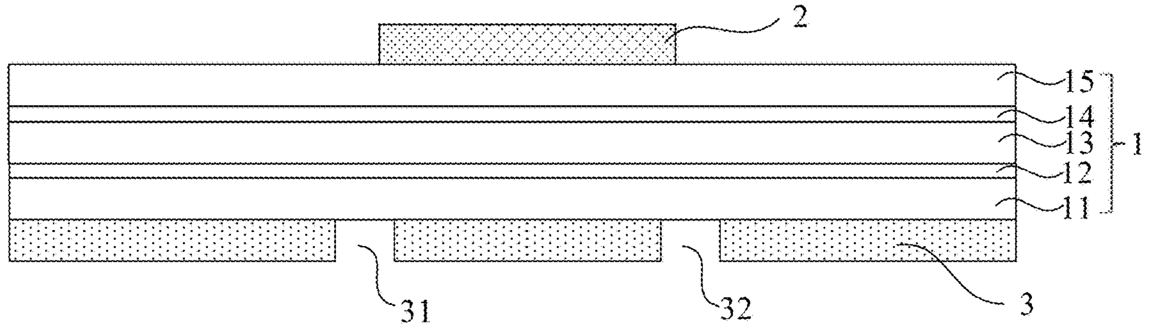
FIG. 3 is another sectional view of the film antenna in FIG. 1 taken along the line A-A'.

In some examples, FIG. 3 is another sectional view of the film antenna in FIG. 1 taken along the line A-A'. As shown in FIG. 3, when the dielectric layer 1 has a composite-layer structure, the dielectric layer 1 includes a first dielectric sub-layer 11, a first adhesive layer 12, a second dielectric sub-layer 13, a second adhesive layer 14 and a third dielectric sub-layer 15, which are sequentially stacked; the ground layer 3 is disposed on a side of the first dielectric sub-layer 11 away from the first adhesive layer 12, that is, a side surface of the first dielectric sub-layer 11 away from the first adhesive layer 12 serves as the second surface of the dielectric layer 1; and the radiation patch 2 is disposed on a side of the third dielectric sub-layer 15 away from the second adhesive layer 14, that is, a side surface of the third dielectric sub-layer 15 away from the second adhesive layer 14 serves as the first surface of the dielectric layer 1. Materials of the first dielectric sub-layer 11 and the third dielectric sub-layer 15 include, but are not limited to, a PI material; a material of the second dielectric sub-layer 13 includes, but is not limited to, a PET material; and materials of the first adhesive layer 12 and the second adhesive layer 14 may use a transparent optically clear adhesive (OCA). When the radiation patch 2 is disposed between the third dielectric sub-layer 15 and the second adhesive layer 14, a protective layer, such as a self-repairing transparent waterproof coating, is further formed on an upper surface of the third dielectric sub-layer 15 to protect the third dielectric sub-layer 15.

Figure 4:
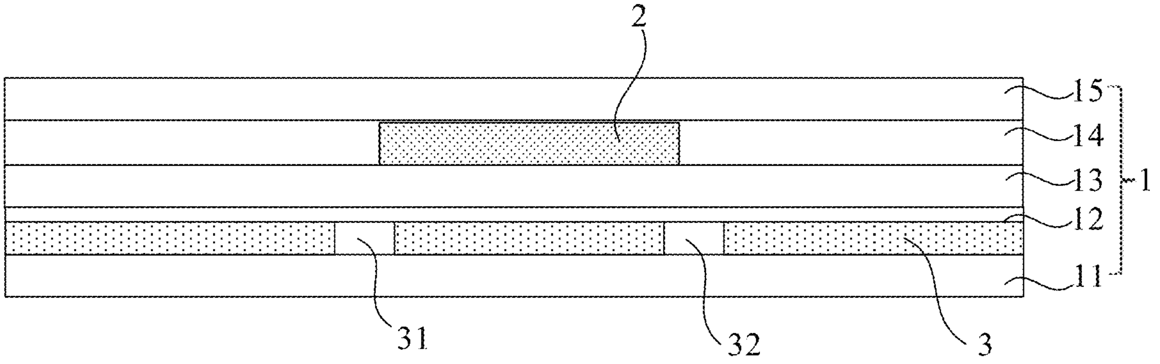
FIG. 4 is another sectional view of the film antenna in FIG. 1 taken along the line A-A'.

In some examples, FIG. 4 is another sectional view of the film antenna in FIG. 1 taken along the line A-A'. As shown in FIG. 4, when the dielectric layer 1 has a composite-layer structure, the dielectric layer 1 includes a first dielectric sub-layer 11, a first adhesive layer 12, a second dielectric sub-layer 13, a second adhesive layer 14 and a third dielectric sub-layer 15, which are sequentially stacked; the ground layer 3 is disposed on a side of the first dielectric sub-layer 11 close to the first adhesive layer 12, that is, a side surface of the first dielectric sub-layer 11 close to the first adhesive layer 12 serves as the second surface of the dielectric layer 1; and the radiation patch 2 is disposed on a side of the second dielectric sub-layer 13 close to the second adhesive layer 14, that is, a side surface of the second dielectric sub-layer 13 close to the second adhesive layer 14 serves as the first surface of the dielectric layer 1. In this case, none of a first microstrip line, a transducer element and a first electrode layer is exposed to outside, so that water and oxygen corrosion can be effectively prevented.

In some examples, when the dielectric layer 1 includes the first dielectric sub-layer 11, the first adhesive layer 12, the second dielectric sub-layer 13, the second adhesive layer 14 and the third dielectric sub-layer 15, which are sequentially stacked, the first dielectric sub-layer 11 and the third dielectric sub-layer 15 may be made of a same material, and have a same thickness or thicknesses substantially the same as each other. The second dielectric sub-layer 13 is different from the first dielectric sub-layer 11 (the third dielectric sub-layer 15) in material and thickness, and the second dielectric sub-layer 13 has a thickness greater than that of the first dielectric sub-layer 11. The thickness of the first dielectric sub-layer 11 (the third dielectric sub-layer 15) ranges from 10 μm to 80 μm, and the thickness of the second dielectric sub-layer 13 ranges from 0.2 mm to 0.7 mm.

The film antenna in the embodiment of the present disclosure is described below with reference to specific implementations.

In a first implementation, as shown in FIG. 1 and FIG. 2, the film antenna includes a dielectric layer 1, a radiation patch 2, a feeder line 4 and a reference electrode layer. The dielectric layer 1 includes a first surface (an upper surface) and a second surface (a lower surface) which are oppositely disposed along a thickness direction of the dielectric layer 1. The radiation patch 2 and the feeder line 4 are disposed on the first surface of the dielectric layer 1, and a ground layer 3 is disposed on the second surface of the dielectric layer 1. Both the radiation patch 2 and the ground layer 3 are plate-shaped electrodes. The radiation patch 2 and the ground layer 3 may have a same shape or have different shapes, and in the embodiment of the present disclosure, the radiation patch 2 and the ground layer 3 having a same shape is taken as an example. The shape of the radiation patch 2 and the ground layer includes, but is not limited to, a rectangle, an oval, a circle, and the like. In FIG. 1, the radiation patch 2 and the ground electrode layer each having a rectangular shape is taken as an example. In this case, the radiation patch 2 has a first radiation edge 201 and a second radiation edge 202, which each extend along a first direction and are arranged side by side along a second direction, and has a third radiation edge 203 and a fourth radiation edge 204, which each extend along the second direction and are arranged side by side along the first direction. The feeder line 4 is connected to the radiation patch 2 at a corner of the radiation patch 2 to supply a microwave signal to the radiation patch 2. The ground layer 3 has two openings (i.e., a first opening 31 and a second opening 32), which each extend along the first direction and are arranged side by side along the second direction, and the first opening 31 and the second opening 32 each are filled with a filling medium. An orthographic projection of the first radiation edge 201 of the radiation patch 2 on the dielectric layer 1 penetrates through an orthographic projection of the first opening 31 on the dielectric layer 1; and an orthographic projection of the second radiation edge 202 of the radiation patch 2 on the dielectric layer 1 penetrates through an orthographic projection of the second opening 32 on the dielectric layer 1. By providing the first opening 31 and the second opening 32 in the ground layer 3, a profile of the film antenna can be lowered, thereby improving radiation efficiency of the thin antenna.

It should be noted that, in the embodiment of the present disclosure, the first direction and the second direction are perpendicular to each other, the first direction is a vertical direction, and the second direction is a horizontal direction, for example. In the embodiment of the present disclosure, it is described by taking the first direction being a vertical direction and the second direction being a horizontal direction as an example. In FIG. 1, the ground layer 3 provided with the first opening 31 and the second opening 32 is taken as an example. Actually, the ground layer 3 may be further provided with a third opening 37 and a fourth opening 38, which each extend along the second direction and are arranged side by side along the first direction, an orthographic projection of the third radiation edge 203 of the radiation patch on the dielectric layer 1 penetrates through an orthographic projection of the third opening 37 on the dielectric layer 1, and an orthographic projection of the fourth radiation edge 204 of the radiation patch on the dielectric layer 1 penetrates through an orthographic projection of the fourth opening 38 on the dielectric layer 1. Certainly, in the embodiment of the present disclosure, the ground layer 3 may be provided with one or more of the first opening 31, the second opening 32, the third opening 37 and the fourth opening 38.

In some examples, a length of the first opening 31 is not less than a length of the first radiation edge 201; and/or a length of the second opening 32 is not less than a length of the second radiation edge 202. For example, the length of the first opening 31 is not less than the length of the first radiation edge 201, and moreover the length of the second opening 32 is not less than the length of the second radiation edge 202. When the ground layer 3 is further provided with the third opening 37 and the fourth opening 38, a length of the third opening 37 is not less than a length of the third radiation edge 203, and/or a length of the fourth opening 38 is not less than a length of the fourth radiation edge 204. With such arrangement, radiation efficiency of a radio frequency signal is effectively improved.

In some examples, if a thickness of the dielectric layer 1 is h, a width of the first opening 31 (the second opening 32) of the ground layer 3 is greater than 5 h, for example, the width of the first opening 31 (the second opening 32) of the ground layer 3 ranges from 5 h to 10 h. The first opening 31 and the second opening 32 each include a first side edge and a second side edge, which each extend along the second direction and are arranged side by side along the first direction; a distance between the orthographic projection of the first radiation edge 201 on the dielectric layer 1 and an orthographic projection of the first side edge of the first opening 31 on the dielectric layer 1 is a, a distance between the orthographic projection of the second radiation edge 202 on the dielectric layer 1 and an orthographic projection of the first side edge of the second opening 32 on the dielectric layer 1 is b, and specific values of a and b may be obtained by simulation and optimization according to the radiation frequency and a height of the dielectric layer 1. The thickness of each of the radiation patch 2 and the ground layer 3 is about 3 times a skin depth.

Figure 8:
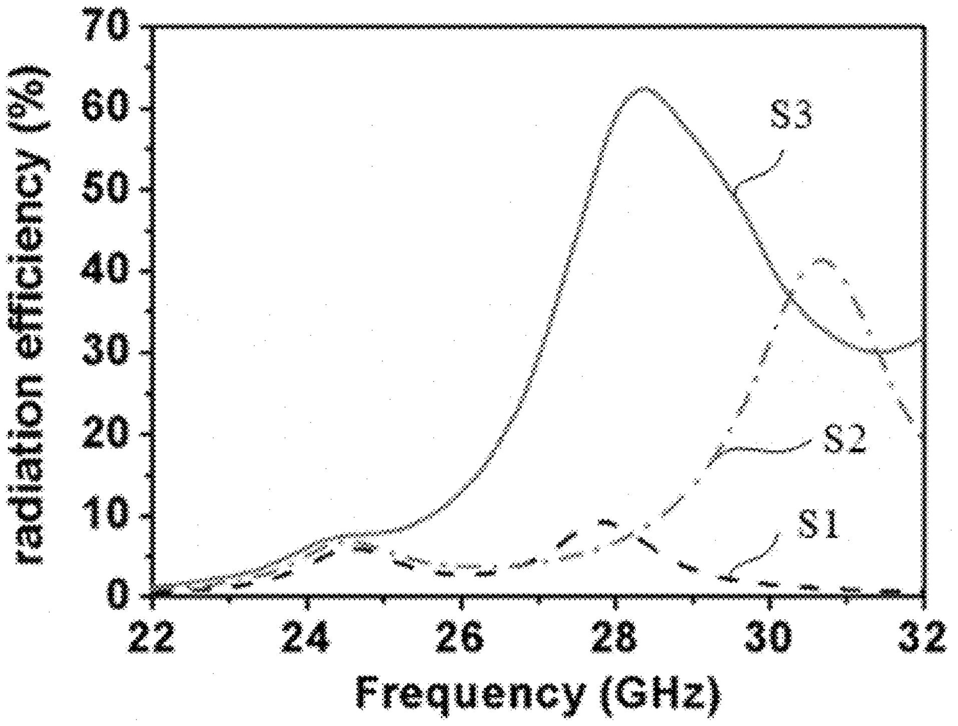
FIG. 8 is a schematic diagram illustrating simulations of film antennas.

In an example, taking a 10-millimeter wave band (30 GHz) as an example, the dielectric layer 1 has a thickness of 20 μm and a dielectric constant of 3; the radiation patch 2 and the ground layer 3 each have a thickness of 3 μm; and the first opening 31 and the second opening 32 each have a width of 250 μm. The first radiation edge 201 and the second radiation edge 202 each have a width of 3.4 μm, the third radiation edge 203 and the fourth radiation edge each have a width of 3 μm, and the first opening 31 and the second opening 32 are disposed corresponding to the first radiation edge 201 and the second radiation edge 202, respectively. As shown in FIG. 8, S1 represents a simulation curve in a case where the ground layer 3 is not provided with the first opening 31 and the second opening 32, S2 represents a simulation curve in a case where the ground layer 3 is provided with the first opening 31 and the second opening 32, and S3 represents a simulation curve in a case where the ground layer 3 is provided with the first opening 31 and the second opening 32, and the first opening 31 and the second opening 32 each are filled with a filling medium. In this case, the film antenna provided with the first opening 31 and the second opening 32 may obtain the radiation efficiency of 42% at a frequency of 31 GHz, and the film antenna not provided with the first opening 31 and the second opening 32 in the ground layer 3 may obtain the radiation efficiency of 8.85% at the frequency of 31 GHz, and thus the radiation efficiency of the antenna provided with openings is approximately 5 times higher than that of the antenna not provided with openings in the ground layer 3. When the first opening 31 and the second opening 32 disposed in the ground layer 3 each are filled with a high dielectric material, the radiation efficiency of the antenna is further increased to 63%, which is more than 7 times higher than that of the antenna not provided with openings. Therefore, the radiation efficiency can be effectively improved when the ground layer is provided with the opening, and certainly, the radiation efficiency can be further improved when the opening is filled with the high dielectric material.

Figure 6:
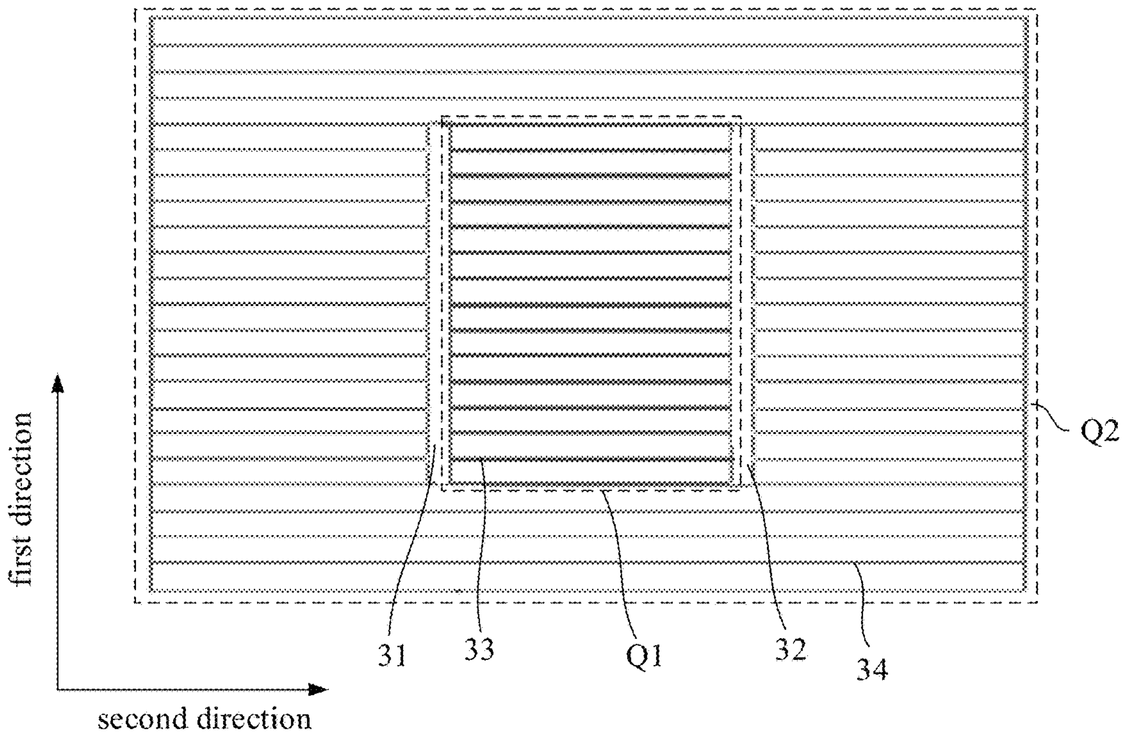
FIG. 6 is a top view of a ground layer of another film antenna according to an embodiment of the present disclosure.
Figure 7:
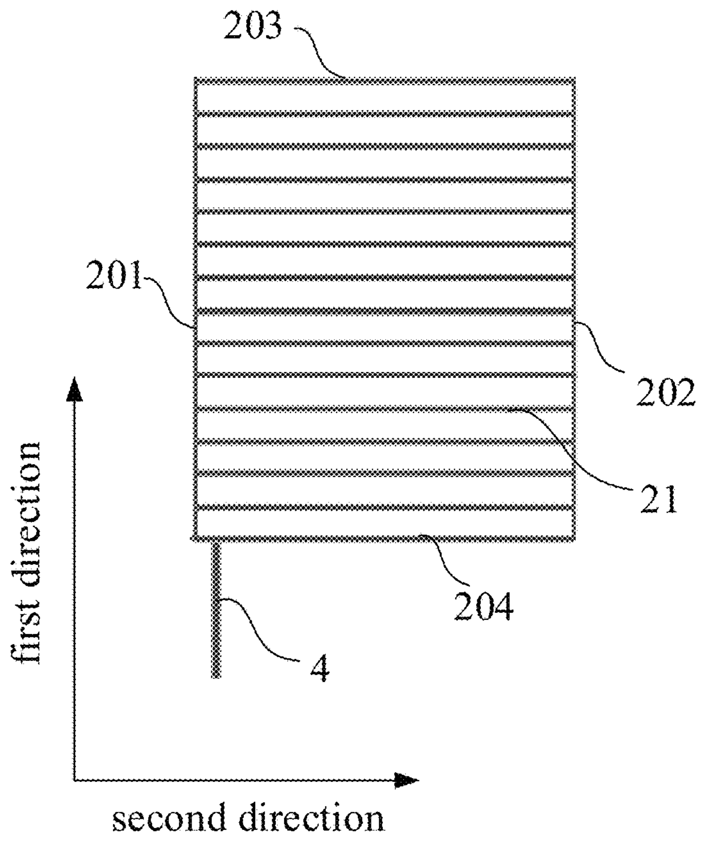
FIG. 7 is a top view of a radiation patch corresponding to the ground layer shown in FIG. 6.

In a second implementation, the film antenna is substantially the same as the film antenna shown in FIG. 1, except that the film antenna here is a transparent film antenna, and the radiation patch 2 and the ground layer 3 in the film antenna each have a hollow out pattern structure. FIG. 6 is a top view of a ground layer 3 of another film antenna according to an embodiment of the present disclosure, FIG. 7 is a top view of a radiation patch 2 corresponding to the ground layer shown in FIG. 6, and FIG. 8 is a schematic diagram illustrating simulations of film antennas. For example, the ground layer 3 includes a middle area Q1 and a peripheral area Q2 surrounding the middle area Q1, and openings of the ground layer 3 are formed at boundary positions of the middle area Q1 and the peripheral area Q2. The ground layer 3 includes a first hollow out pattern in the middle area Q1 and a second hollow out pattern in the peripheral area Q2. The radiation patch 2 includes a third hollow out pattern, and an orthographic projection of the radiation patch 2 on the dielectric layer 1 covers an orthographic projection of the middle area Q1 of the ground layer 3 on the dielectric layer 1. Orthographic projections of hollow out parts of the first hollow out pattern on the dielectric layer 1 overlap orthographic projections of hollow out parts of the third hollow out pattern on the dielectric layer 1, and with such an arrangement, light transmittance of the film antenna is improved to a maximum extent while radiation efficiency of the film antenna is improved.

For example, as shown in FIG. 7, the first hollow out pattern includes a plurality of first metal lines 33, which each extend along the second direction and are arranged side by side along the first direction, and gaps between adjacent ones of the first metal lines 33 define the hollow out parts of the first hollow out pattern. The second hollow out pattern includes a plurality of second metal lines 34, which each extend along the second direction and are arranged side by side along the first direction, and gaps between adjacent ones of the second metal lines 34 define hollow out parts of the second hollow out pattern. The third hollow out pattern includes a plurality of third metal lines 21, which each extend along the second direction and are arranged side by side along the first direction, and gaps between adjacent ones of the third metal lines 21 define the hollow out parts of the third hollow out pattern. Since the orthographic projections of the hollow out parts of the first hollow out pattern on the dielectric layer 1 overlap the orthographic projections of the hollow out parts of the third hollow out pattern on the dielectric layer 1, an orthographic projection of each of the third metal lines 21 on the dielectric layer 1 overlaps an orthographic projection of one of the first metal lines 33 on the dielectric layer 1, for example, the third metal lines 21 are disposed corresponding to the first metal lines 33 one by one.

Continuously referring to FIG. 7, since the first opening 31 and the second opening 32 are disposed in the ground layer 3, and the first hollow out pattern is disposed in the middle area Q1 of the ground layer 3, a portion of the second metal lines 34 in the peripheral area Q2 include first line segments distributed on a side of the first opening 31 away from the middle area Q1 and second line segments distributed on a side of the second opening 32 away from the middle area Q1. Orthographic projections of extension lines of each of the first metal lines on the dielectric layer 1 overlap orthographic projections of the first line segment and the second line segment of one of the second metal lines 34 on the dielectric layer 1. In this case, the first hollow out pattern and the second hollow out pattern on the dielectric layer 1 may be formed by a single patterning process, and positions of the ground layer 3 formed by the first hollow out pattern and the second hollow out pattern have a same light transmittance, so that optical uniformity of the film antenna is ensured. In addition, in the embodiment of the present disclosure, the first metal line 33, the second metal line 34 and the third metal line 21 have a same extending direction, i.e., each extend in a same direction, and thus microwave energy or millimeter wave energy transmitted may be scattered to free space through the first opening 31 and the second opening 32 to a maximum extent.

It should be noted that, in FIG. 6 and FIG. 7, it is described by taking the first metal line 33, the second metal line 34 and the third metal line 21 having the same extending direction as an example. However, in actual design, as long as extending directions of the first metal line 33, the second metal line 34 and the third metal line 21 are different from extending directions of the first opening 31 and the second opening 32, and thus, the extending direction of the first metal line 33, the second metal line 34 and the third metal line 21 being the second direction does not limit the protection scope of the embodiment of the present disclosure.

In an example, for a free wavelength of about 10 millimeters (30 GHz), the first metal line 33, the second metal line 34 and the third metal line 21 each have a width ranging from 2 μm to 20 μm, and each of the hollow out parts of the first hollow out pattern, each of the hollow out parts of the second hollow out pattern and each of the hollow out parts of the third hollow out pattern each have a width in a hundred-micron scale. It is verified through a simulation experiment that the radiation efficiency of the film antenna having the structure shown in FIG. 6 is about 47%.

Figure 9:
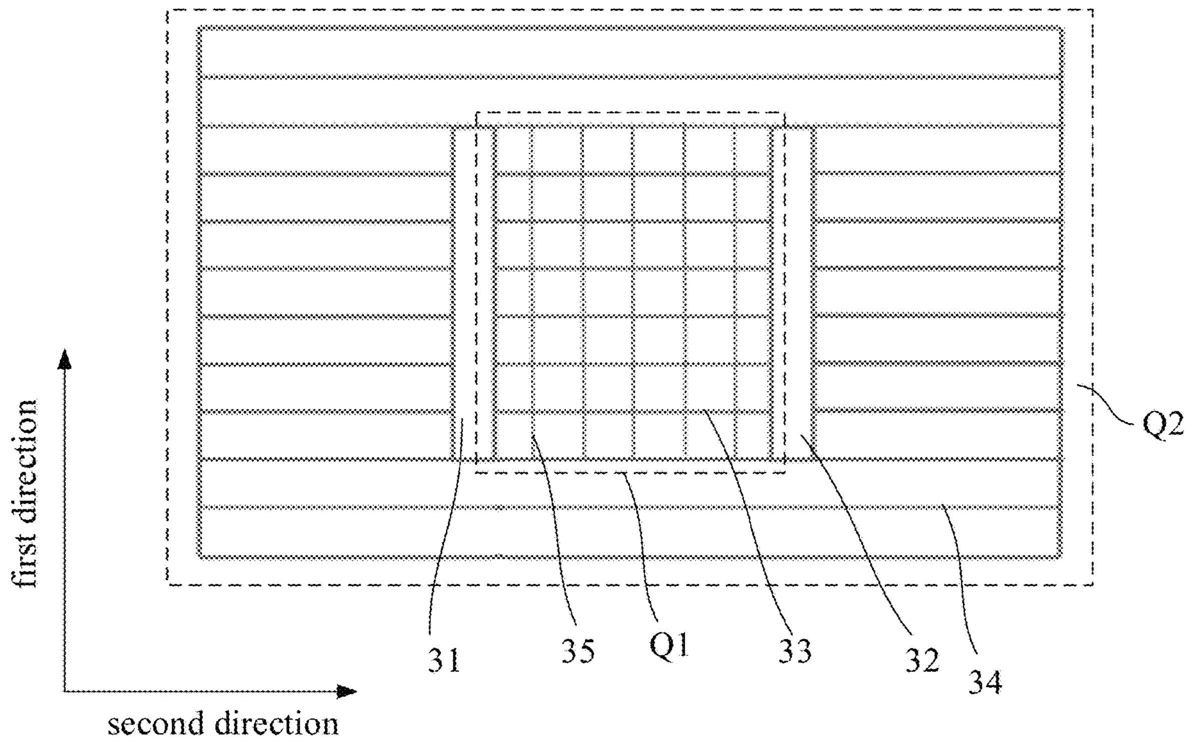
FIG. 9 is a top view of a ground layer of another film antenna according to an embodiment of the present disclosure.
Figure 10:
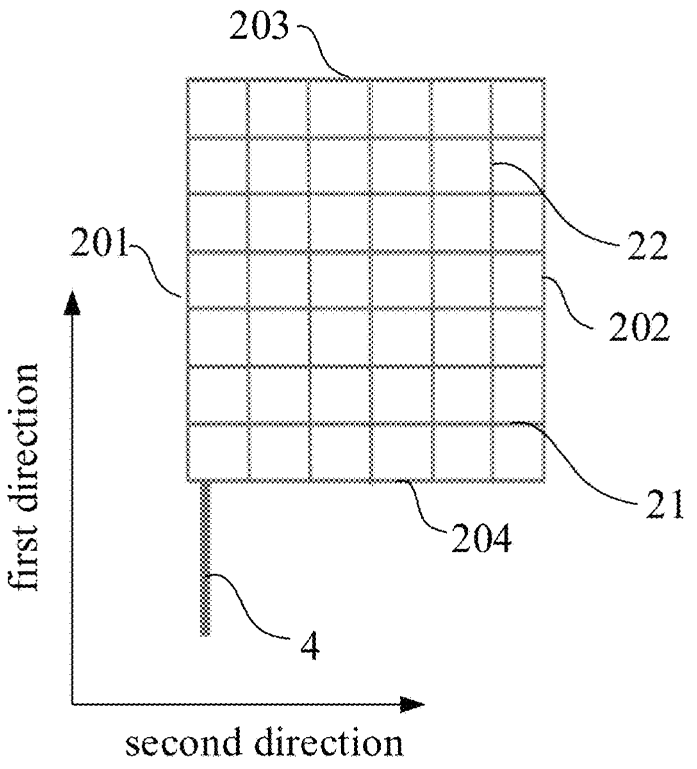
FIG. 10 is a top view of a radiation patch of another film antenna according to an embodiment of the present disclosure.

For example, FIG. 9 is a top view of a ground layer 3 of another film antenna according to an embodiment of the present disclosure, and FIG. 10 is a top view of a radiation patch 2 of another film antenna according to an embodiment of the present disclosure. As shown in FIG. 9 and FIG. 10, the film antenna here is substantially the same as the film antenna having the structure shown in FIG. 6 in structure, except that the first hollow out pattern in the middle area Q1 of the ground layer 3 here includes not only the first metal lines 33, which each extend along the second direction and are arranged side by side along the first direction, but also a plurality of fourth metal lines 35 intersecting the first metal lines 33, and the fourth metal lines 35 each extend along the first direction and are arranged side by side along the second direction. Accordingly, the third hollow out pattern of the radiation patch 2 here includes not only the third metal lines 21, which each extend along the second direction and are arranged side by side along the first direction, but also a plurality of fifth metal lines 22 intersecting the third metal lines 21, and the fifth metal lines 22 each extend along the first direction and are arranged side by side along the second direction. Since the orthographic projections of the hollow out parts of the first hollow out pattern on the dielectric layer 1 overlap the orthographic projections of the hollow out parts of the third hollow out pattern on the dielectric layer 1, an orthographic projection of each of the fourth metal lines 35 on the dielectric layer 1 overlaps an orthographic projection of one of the fifth metal lines 22 on the dielectric layer 1, for example, the fourth metal lines 35 are disposed corresponding to the fifth metal lines 22 one by one.

In the film antenna shown in FIG. 9 and FIG. 10, the first hollow out pattern and the third hollow out pattern each have a grid structure, and a grid density of the first hollow out pattern and the third hollow out pattern here is increased compared with the grid density of the first hollow out pattern and the third hollow out pattern shown in FIG. 6, so that a radiation gain of microwave and millimeter wave can be improved.

Figure 11:
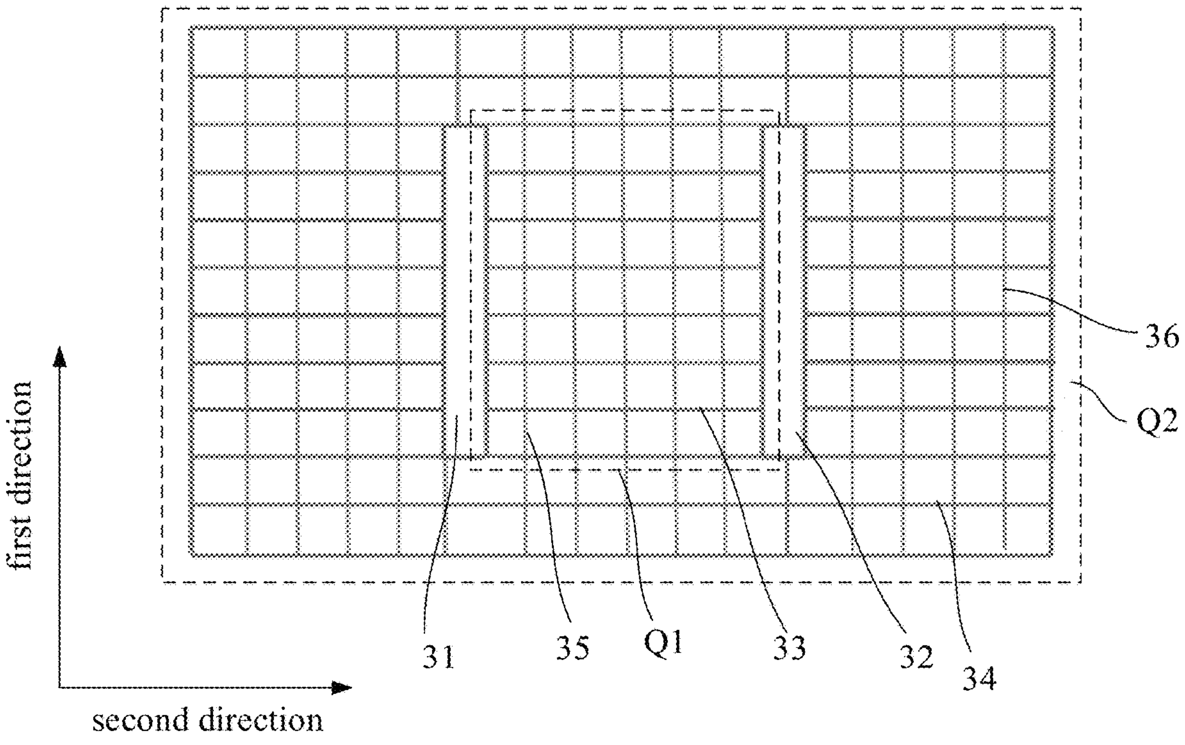
FIG. 11 is a top view of a ground layer of another film antenna according to an embodiment of the present disclosure.

In some examples, FIG. 11 is a top view of a ground layer 3 of another film antenna according to an embodiment of the present disclosure.

As shown in FIG. 11, in the ground layer 3, not only the first hollow out pattern in the middle area Q1 is a grid pattern, but also the second hollow out pattern in the peripheral area Q2 is a grid pattern. For example, the second hollow out pattern includes not only the second metal lines 34, which each extend along the second direction and are arranged side by side along the first direction, but also a plurality of sixth metal lines 36 intersecting the second metal lines 34, and the sixth metal lines 36 each extend along the first direction and are arranged side by side along the second direction. A size of the hollow out part in the first hollow out pattern is the same as a size of the hollow out part in the second hollow out pattern, thereby ensuring uniform light transmittance of the film antenna.

Figure 12:
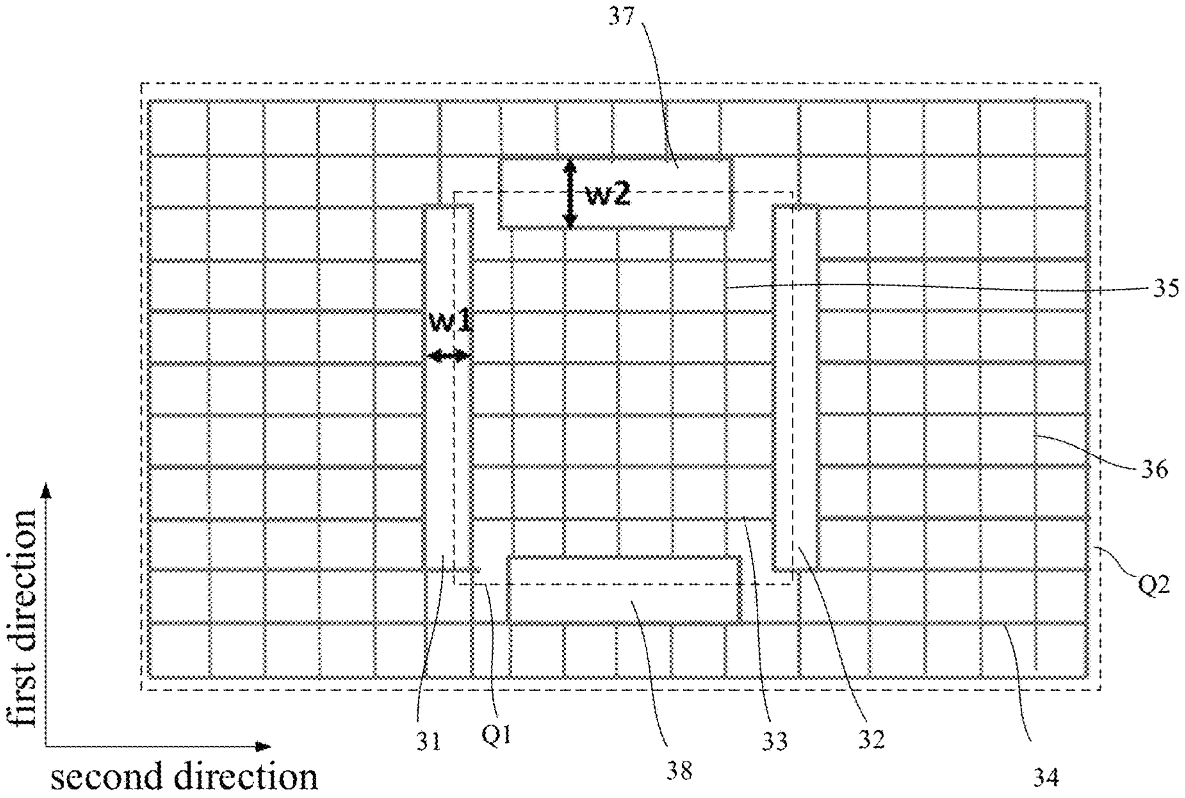
FIG. 12 is a top view of a ground layer of another film antenna according to an embodiment of the present disclosure.

Furthermore, FIG. 12 is a top view of a ground layer 3 of another film antenna according to an embodiment of the present disclosure. The ground layer 3 here is substantially the same as the ground layer 2 shown in FIG. 9 in structure, except that the ground layer 3 here includes not only the first opening 31 and the second opening 32, but also a third opening 37 and a fourth opening 38. The first opening 31 and the second opening 32 each have a width W1, and the third opening 37 and the fourth opening 38 each have a width W2; and in some examples, W2=W1. With such a structure, operating frequency bands corresponding to horizontal polarization and vertical polarization may be designed respectively, so that a dual polarization antenna is realized. There are various ways for energy feeding of dual polarization. FIG. 10 only shows that a feeder line 4 performs energy feeding and receiving from a corner of a rectangular patch.

Figure 13:
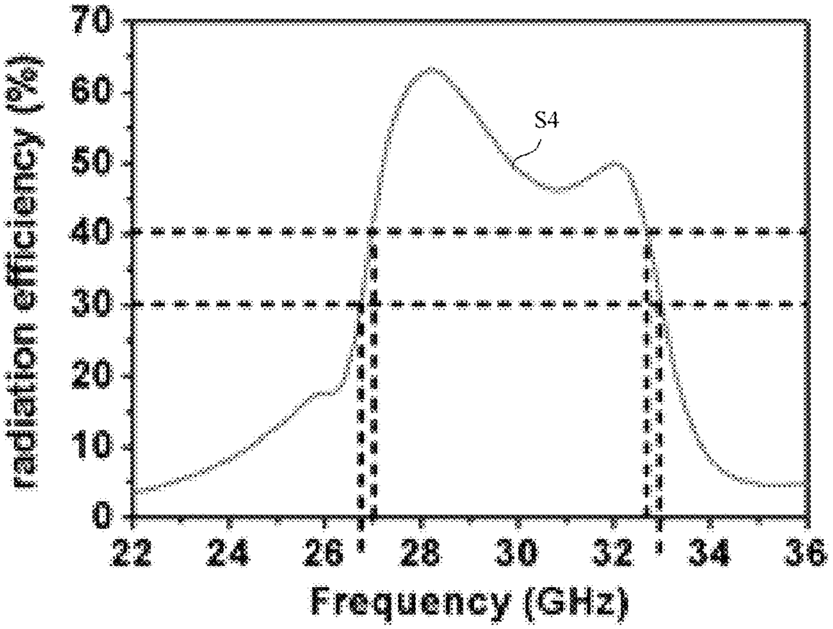
FIG. 13 is a schematic diagram illustrating simulation of a film antenna having the structure shown in FIG. 12.

For the radiation patch 2 shown in FIG. 10, the first radiation edge 201 and the second radiation edge 202 each have a width of 3.4 μm, and the third radiation edge 203 and the fourth radiation edge each have a width of 3 μm; the first metal line 33, the second metal line 34, the third metal line 21, the fourth metal line 35, the fifth metal line 22 and the sixth metal line 36 each have a same width, for example, the width is equal to 15 μm; the first opening 31 and the second opening 32 each have a same width W1, which is the same as a width W2 of each of the third opening 37 and the fourth opening 38, and W1 and W2 each are equal to 250 μm; and each hollow out part has a width of 185 μm. FIG. 13 is a schematic diagram illustrating simulation of the film antenna having the structure shown in FIG. 12. As shown in FIG. 13, it is shown through simulation that the maximum radiation efficiency of the film antenna can reach 63%, a bandwidth with the radiation efficiency of 30% can reach 20.7%, and a bandwidth with the radiation efficiency of 40% can reach 19%, as shown by S4 in FIG. 13. A realized gain can reach 4.13 dB.

Figure 14:
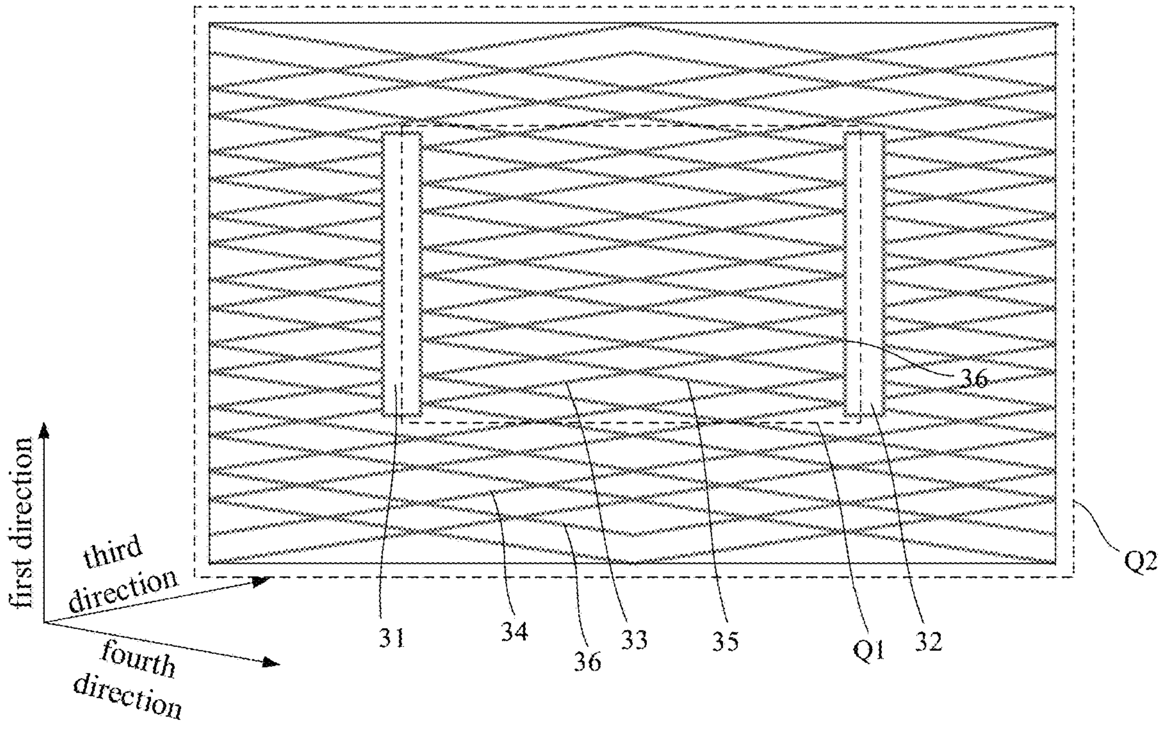
FIG. 14 is a top view of a ground layer of another film antenna according to an embodiment of the present disclosure.
Figure 15:
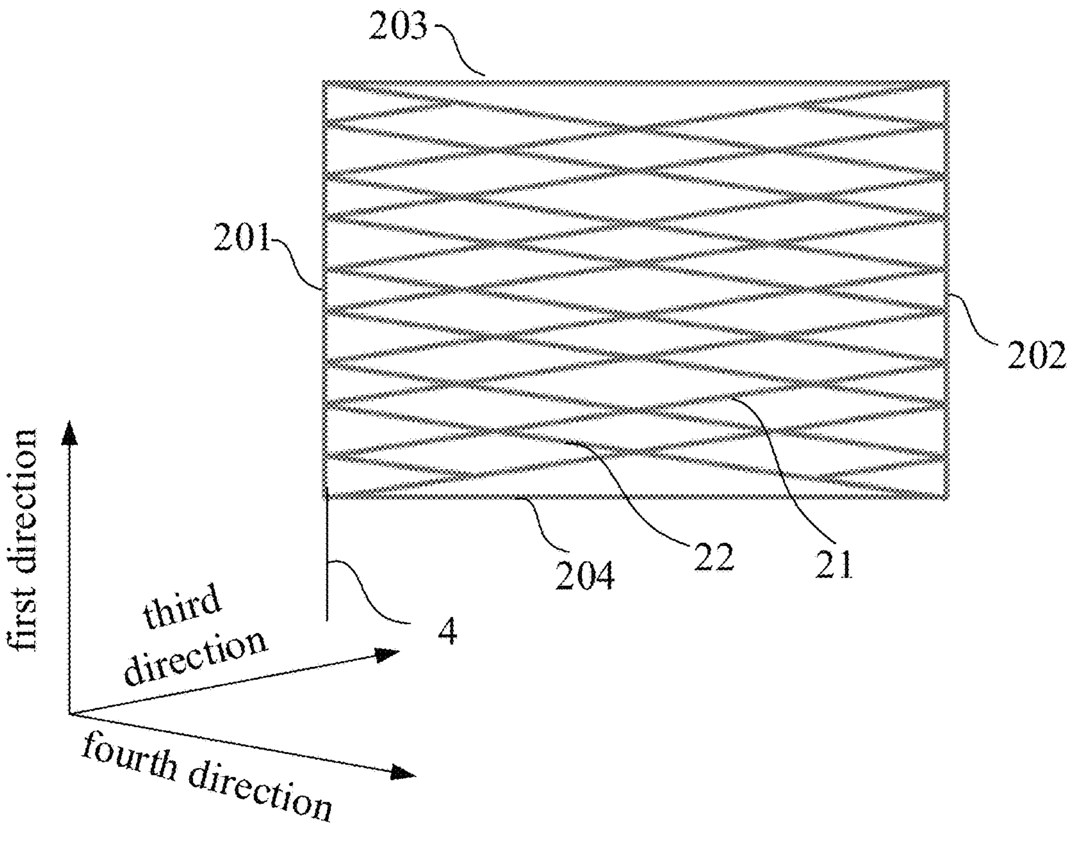
FIG. 15 is a top view of a radiation patch of another film antenna according to an embodiment of the present disclosure.

In a third implementation, FIG. 14 is a top view of a ground layer 3 of another film antenna according to an embodiment of the present disclosure, and FIG. 15 is a top view of a radiation patch 2 of another film antenna according to an embodiment of the present disclosure. As shown in FIG. 14 and FIG. 15, the film antenna here is substantially the same as the film antenna having the structure shown in FIG. 11, except that in the first hollow out pattern, the first metal lines 33 each extend along a third direction and are arranged side by side along the first direction; the fourth metal lines 35 each extend along a fourth direction and are arranged side by side along the first direction; in the second hollow out pattern, the second metal lines 34 each extend along the third direction and are arranged side by side along the first direction; the sixth metal lines 36 each extend along the fourth direction and are arranged side by side along the first direction; in the third hollow out pattern, the third metal lines 21 each extends along the third direction and are arranged side by side along the first direction; and the fifth metal lines 22 each extend along the fourth direction and are arranged side by side along the first direction. The third direction and the first direction are intersected with each other, but are not perpendicular to each other; and the fourth direction and the first direction are intersected with each other, but are not perpendicular to each other. In this way, the hollow out part in the first hollow out pattern, the hollow out part in the second hollow out pattern and the hollow out part in the third hollow out pattern each are a diamond grid. The other structures of the film antenna here are the same as those of the film antenna having the structure shown in FIG. 11, and thus are not repeatedly described herein. The film antenna here also can realize the functions of lowering the profile and increasing the radiation.

Figure 16:
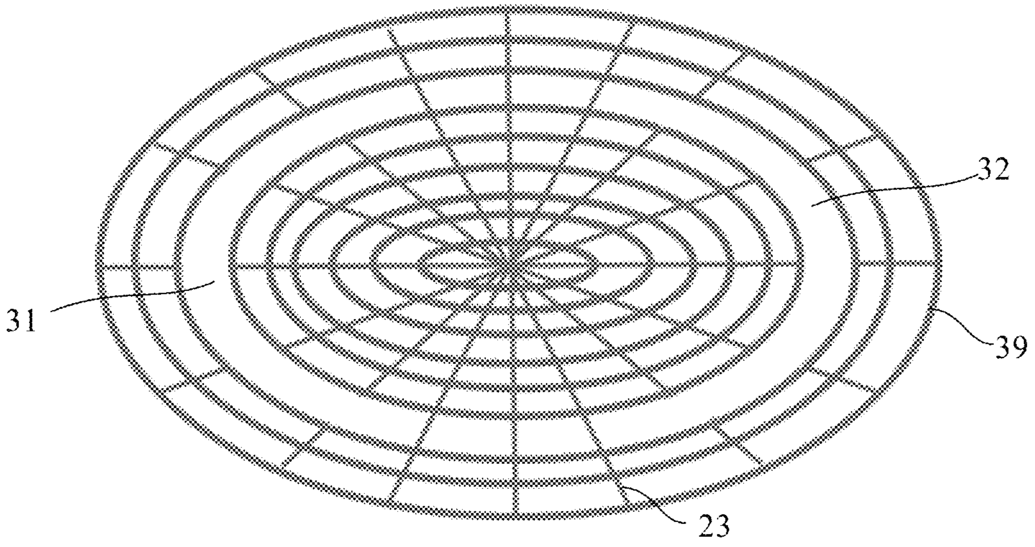
FIG. 16 is a top view of a ground layer of another film antenna according to an embodiment of the present disclosure.
Figure 17:
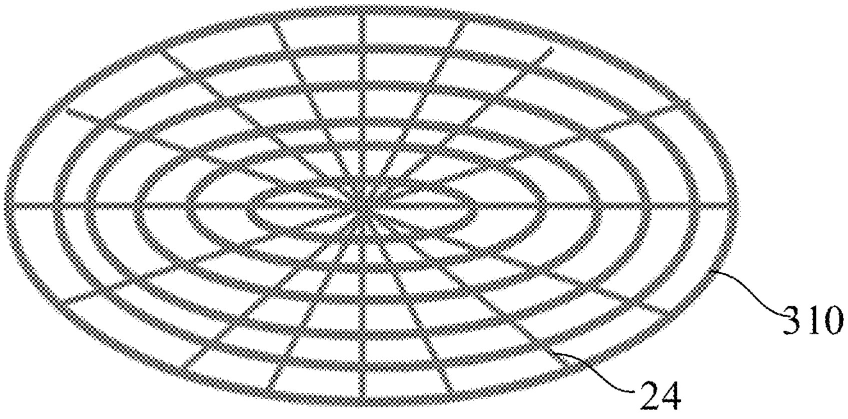
FIG. 17 is a top view of a radiation patch of another film antenna according to an embodiment of the present disclosure.

In a fourth implementation, FIG. 16 is a top view of a ground layer 3 of another film antenna according to an embodiment of the present disclosure, and FIG. 17 is a top view of a radiation patch 2 of another film antenna according to an embodiment of the present disclosure. As shown in FIG. 16 and FIG. 17, the radiation patch 2 and the ground layer 3 in the film antenna each are oval. Certainly, the radiation patch 2 and the ground layer 3 each may be circular or the like. The ground layer 3 includes a plurality of seventh metal lines 39 concentrically arranged in circles and a plurality of eighth metal lines 23 radiating from a center of the ground layer 3 to an edge of the ground layer, and at least a portion of the eighth metal lines 23 each are disconnected at positions of the seventh metal lines 39 to define an opening. For example, in FIG. 16, a portion of the eighth metal line 23 each are disconnected at the positions of the seventh metal lines 39 to define two openings, i.e., a first opening 31 and a second opening 32. The radiation patch 2 includes a plurality of ninth metal lines 310 concentrically arranged in circles and a plurality of tenth metal lines 24 radiating from a center of the radiation patch 2 to an edge of the radiation patch 2. In this case, an orthographic projection of each of the ninth metal line 310 on the dielectric layer 1 overlaps an orthographic projection of one of the seventh metal lines 39 on the dielectric layer 1, and an orthographic projection of each of the tenth metal lines 24 on the dielectric layer 1 overlaps an orthographic projection of one of the eighth metal lines 23 on the dielectric layer 1. A distance between any two adjacent ones of the seventh metal lines 39 is equal to a distance between any two adjacent ones of the ninth metal lines 310, but the number of the ninth metal lines 310 is less than the number of the seventh metal lines 39. The number of the eighth metal lines 23 may be equal to the number of the tenth metal lines 24. An orthographic projection of the ninth metal line 310 farthest away from the center on the dielectric layer 1 penetrates through the orthographic projections of the first opening 31 and the second opening 32 on the dielectric layer 1. The film antenna here can also realize the functions of lowering the profile and increasing the radiation.

In some examples, the first opening 31 and the second opening 32 in FIG. 16 forms a centrosymmetric pattern, which facilitates adjustment of the radiation frequency of the film antenna.

According to the film antenna provided by the embodiment of the present disclosure, firstly, openings corresponding to an edge of a microstrip patch are formed in a ground layer 3 of a conventional microstrip patch antenna, such that radiation efficiency of the radiation patch 2 can realize more than 40% with a profile lower than a wavelength of 1%; and secondly, the openings of the grounding layer 2 each are filled with a low-loss high dielectric constant material, such that the radiation efficiency of a resonance frequency band is further improved, and a radiation bandwidth can reach more than 20%. In addition, by designing metal grids of the ground layer 2 and the radiation patch 2, a design of an ultra-low profile can be realized while ensuring a relatively high radiation efficiency of the antenna, and meanwhile, thinning and transparentizing of a microwave patch antenna can be achieved.

Figure 18:
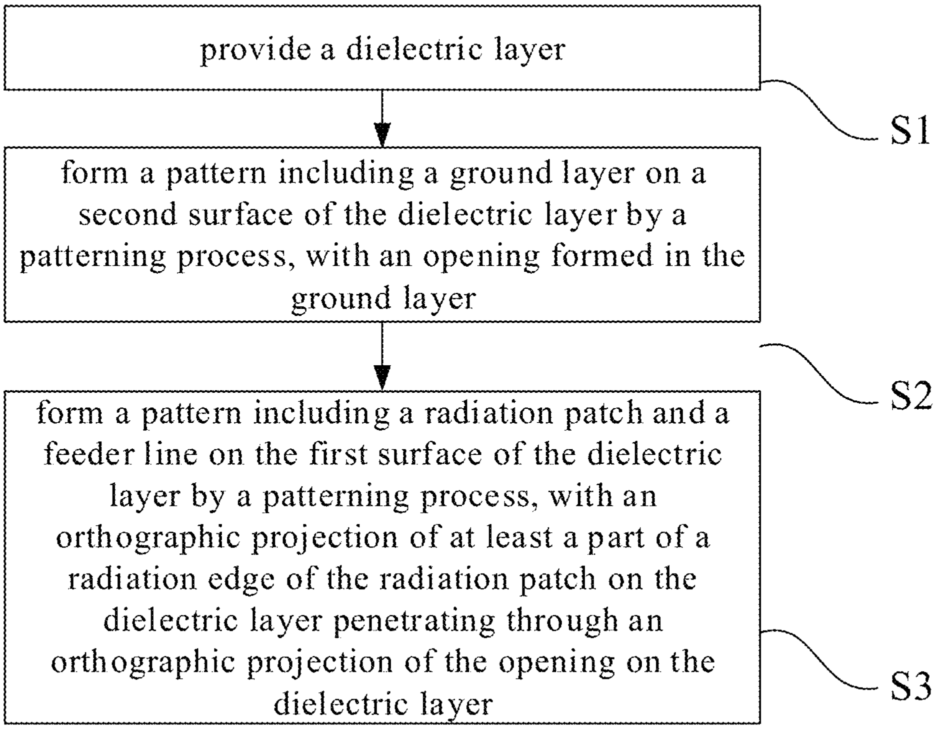
FIG. 18 is a flowchart illustrating a method for manufacturing a film antenna according to an embodiment of the present disclosure.

In a second aspect, FIG. 18 is a flowchart illustrating a method for manufacturing a film antenna according to an embodiment of the present disclosure. As shown in FIG. 18, an embodiment of the present disclosure provides a method for manufacturing a film antenna, which may be used to manufacture any film antenna described above. The method specifically includes the following steps S1 to S3.

At S1, a dielectric layer 1 is provided.

The dielectric layer 1 may use a flexible substrate or a glass substrate, and the S1 may include a step of cleaning the dielectric layer 1.

At S2, a pattern including a ground layer 3 is formed on a second surface of the dielectric layer 1 by a patterning process. An opening is formed in the ground layer 3.

In some examples, the S2 may specifically include: depositing a first metal film on the second surface of the dielectric layer 11 by magnetron sputtering, which is not limited thereto, then performing coating, exposure and development, subsequently performing wet etching and stripping of photoresist after etching, to form the pattern including the ground layer 3.

At S3, a pattern including a radiation patch 2 and a feeder line 4 is formed on a first surface of the dielectric layer 1 by a patterning process. An orthographic projection of at least a part of a radiation edge of the radiation patch 2 on the dielectric layer 1 penetrates through an orthographic projection of the opening on the dielectric layer 1.

In some examples, the S3 may specifically include: depositing a second metal film on the first surface of the dielectric layer 1 by magnetron sputtering, which is not limited thereto, then performing coating, exposure and development, subsequently performing wet etching and stripping of photoresist after etching, to form the pattern including the radiation patch 2 and the feeder line 4.

It should be noted that, the sequence of the S2 and the S3 may be interchanged, that is, the radiation patch 2 and the feeder line 4 may be formed on the first surface of the dielectric layer 1 firstly, and then the ground layer 3 may be formed on the second surface of the dielectric layer 1, which are within the protection scope of the embodiment of the present disclosure.

Figure 19:
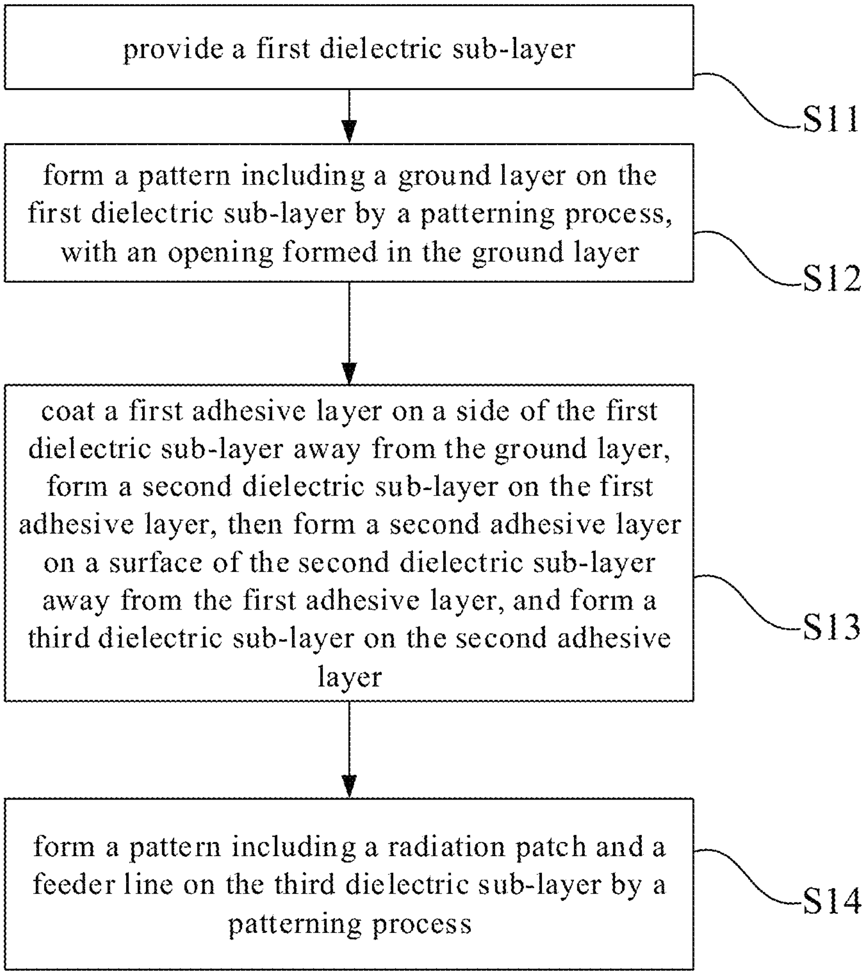
FIG. 19 is a flowchart illustrating another method for manufacturing a film antenna according to an embodiment of the present disclosure.

In some examples, as shown in FIG. 3, the dielectric layer 1 in the embodiment of the present disclosure includes a first dielectric sub-layer 11, a first adhesive layer 12, a second dielectric sub-layer 13, a second adhesive layer 14 and a third dielectric sub-layer 15, which are sequentially stacked. A surface of the first dielectric sub-layer 11 away from the first adhesive layer 12 serves as the second surface of the dielectric layer 1, and a surface of the third dielectric sub-layer 15 away from the second adhesive layer 14 serves as the first surface of the dielectric layer 1, that is, the ground layer 3 is disposed on a side of the first dielectric sub-layer 11 away from the first adhesive layer 12, and the radiation patch 2 and the feeder line 4 are disposed on a side of the third dielectric sub-layer 15 away from the second adhesive layer 14. FIG. 19 is a flowchart illustrating another method for manufacturing a film antenna according to an embodiment of the present disclosure. As shown in FIG. 19, the method according to the embodiment of the present disclosure may also be implemented by the following steps S11 to S14.

At S11, a first dielectric sub-layer 11 is provided.

The first dielectric sub-layer 11 may use a PI substrate, and the S11 may include a step of cleaning the first dielectric sub-layer 11.

At S12, a pattern including a ground layer 3 is formed on the first dielectric sub-layer 11 by a patterning process. An opening is formed in the ground layer 3.

Steps of forming the ground layer 3 are the same as those in the S2, and thus are not repeatedly described herein.

At S13, a first adhesive layer 12 is coated on a side of the first dielectric sub-layer 11 away from the ground layer 3, a second dielectric sub-layer 13 is formed on the first adhesive layer 12, a second adhesive layer 14 is formed on a surface of the second dielectric sub-layer 13 away from the first adhesive layer 12, and a third dielectric sub-layer 15 is formed on the second adhesive layer 14.

The second dielectric sub-layer 13 may use a PET substrate, and the third dielectric sub-layer 15 may use a PI substrate. The first adhesive layer 12 and the second adhesive layer 14 may use OCA.

At S14, a pattern including a radiation patch 2 and a feeder line 4 is formed on the third dielectric sub-layer 15 by a patterning process.

Steps of forming the radiation patch 2 and the feeder line 4 are the same as those in the S3, and thus are not repeatedly described herein.

It should be noted that, it is described by taking the steps S11 to S13 preceding the step S14 as an example above, but in the actual process, the step S14 may be performed firstly, and then the steps S11 to S13 may be performed.

Referring to FIG. 4, the radiation patch 2 and the feeder line 4 may be disposed between the second dielectric sub-layer 13 and the second adhesive layer 14, and the ground layer 3 may be disposed between the first dielectric sub-layer 11 and the first adhesive layer 12, and formations thereof may be similar to those described above, and thus are not repeatedly described herein.

Figure 20:
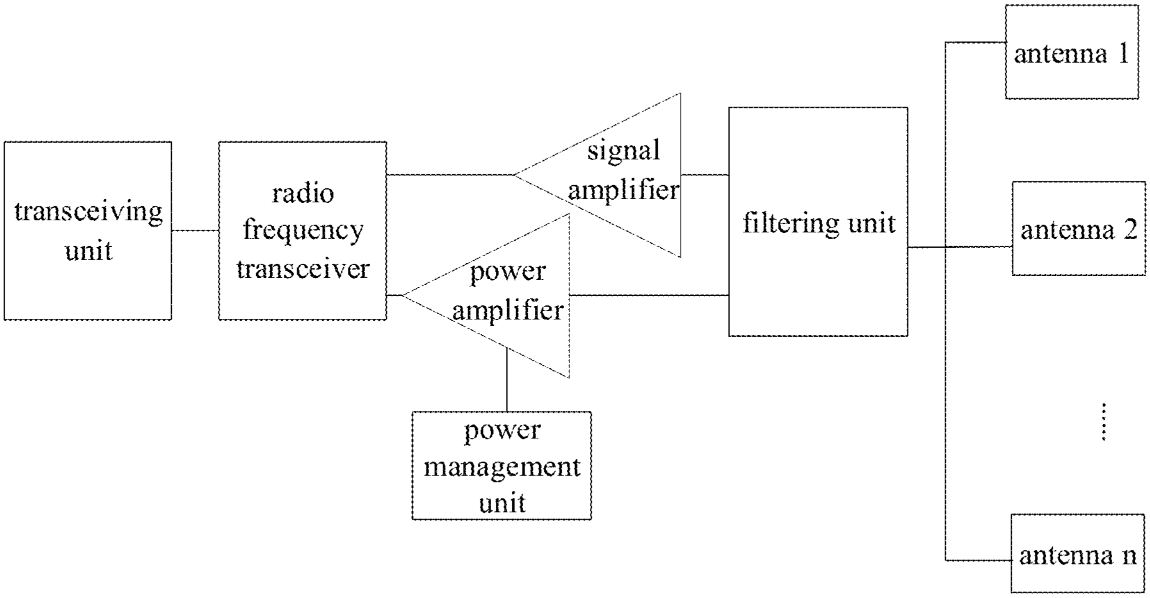
FIG. 20 is a schematic structural diagram of an antenna system according to an embodiment of the present disclosure.

In a third aspect, FIG. 20 is a schematic structural diagram of an antenna system according to an embodiment of the present disclosure. As shown in FIG. 20, an embodiment of the present disclosure provides an antenna system, including at least one antenna described above.

In some examples, the antenna system provided by the embodiment of the present disclosure further includes a transceiving element, a radio frequency transceiver, a signal amplifier, a power amplifier and a filtering element. The antenna in the antenna system may serve as a transmitting antenna or a receiving antenna. The transceiving element may include a baseband and a receiving terminal, and the baseband supplies a signal of at least one frequency band, such as 2G signal, 3G signal, 4G signal, 5G signal and the like, and transmits the signal of the at least one frequency band to the radio frequency transceiver. After receiving a signal by the antenna in the antenna system, the antenna may transmit the signal to a receiving terminal in the transceiving element after the signal is processed by the filtering element, the power amplifier, the signal amplifier and the radio frequency transceiver, and the receiving terminal may be, for example, an intelligent gateway.

Furthermore, the radio frequency transceiver is connected to the transceiving element, and is configured to modulate a signal transmitted from the transceiving element or configured to demodulate a signal received by the antenna and then transmit the demodulated signal to the transceiving element. Specifically, the radio frequency transceiver may include a transmitting circuit, a receiving circuit, a modulating circuit and a demodulating circuit, the transmitting circuit receives various types of signals supplied by the baseband, then the modulating circuit may modulate the various types of signals supplied by the baseband and then transmit the modulated signals to the antenna. The antenna receives the signal and transmits the signal to the receiving circuit of the radio frequency transceiver, the receiving circuit transmits the signal to the demodulating circuit, and the demodulating circuit demodulates the signal and transmits the demodulated signal to the receiving terminal.

Furthermore, the radio frequency transceiver is connected to the signal amplifier and the power amplifier, the signal amplifier and the power amplifier are further connected to the filtering element, and the filtering element is connected to at least one antenna. In a process of transmitting a signal by the antenna system, the signal amplifier is configured to increase a signal-to-noise ratio of a signal output by the radio frequency transceiver and then transmit the signal to the filtering element; the power amplifier is configured to amplify power of the signal output by the radio frequency transceiver and then transmit the signal to the filtering element; and the filtering element specifically includes a duplexer and a filtering circuit, the filtering element combines signals output by the signal amplifier and the power amplifier and filters noise waves and then transmits a signal to the antenna, and the antenna radiates the signal out. In a process of receiving a signal by the antenna system, the antenna receives the signal and then transmits the signal to the filtering element, the filtering element filters noise waves for the signal received by the antenna and then transmits the signal to the signal amplifier and the power amplifier, and the signal amplifier gains the signal received by the antenna to increase the signal-to-noise ratio of the signal, and the power amplifier amplifies the power of the signal received by the antenna. The signal received by the antenna is processed by the power amplifier and the signal amplifier and then is transmitted to the radio frequency transceiver, and the radio frequency transceiver transmits the signal to the transceiving element.

In some examples, the signal amplifier may include various types of signal amplifiers, such as low noise amplifier, which is not limited herein.

In some examples, the antenna system provided by the embodiment of the present disclosure further includes a power management element connected to the power amplifier and configured to supply a voltage for amplifying a signal.

It should be understood that the above implementations are merely exemplary implementations that are employed to illustrate the principles of the present disclosure, and that the present disclosure is not limited thereto. Various changes and modifications may be made by those skilled in the art without departing from the spirit and essence of the present disclosure, and should be considered to fall within the protection scope of the present disclosure.

What is claimed is:

1. An antenna, comprising:
- a dielectric layer having a first surface and a second surface which are oppositely disposed along a thickness direction of the dielectric layer;
- a radiation patch disposed on the first surface of the dielectric layer; and
- a reference electrode layer disposed on the second surface of the dielectric layer and having an orthographic projection on the second surface at least partially overlapping an orthographic projection of the radiation patch on the second surface; wherein
- the reference electrode layer has an opening penetrating therethrough along a thickness direction of the reference electrode layer, and an orthographic projection of at least a part of a radiation edge of the radiation patch on the first surface is located within an orthographic projection of the opening on the first surface,
- wherein the reference electrode layer has a middle area and a peripheral area surrounding the middle area; the opening penetrates through at least a part of a boundary line between the middle area and the peripheral area; an orthographic projection of the radiation patch on the first surface covers an orthographic projection of the middle area of the reference electrode layer on the first surface; and
- the reference electrode layer comprises a first hollow out pattern in the middle area and a second hollow out pattern in the peripheral area; and the radiation patch comprises a third hollow out pattern.

2. The antenna of claim 1, wherein orthographic projections of hollow out parts of the first hollow out pattern on the first surface completely overlap orthographic projections of hollow out parts of the third hollow out pattern on the first surface.

3. The antenna of claim 1, wherein the radiation patch comprises a first radiation edge and a second radiation edge, which each extend along a first direction and are arranged side by side along a second direction; the opening comprises a first opening and a second opening, which each extend along the first direction and are arranged side by side along the second direction; an orthographic projection of the first radiation edge on the dielectric layer penetrates through an orthographic projection of the first opening on the dielectric layer; and an orthographic projection of the second radiation edge on the dielectric layer penetrates through an orthographic projection of the second opening on the dielectric layer.

4. The antenna of claim 3, wherein a length of the first opening is not less than a length of the first radiation edge; and/or a length of the second opening is not less than a length of the second radiation edge.

5. The antenna of claim 3, wherein the first hollow out pattern comprises a plurality of first metal lines, which each extend along a third direction and are arranged side by side along the first direction, and gaps between the first metal lines define the hollow out parts of the first hollow out pattern;
- the second hollow out pattern comprises a plurality of second metal lines, which each extend along the third direction and are arranged side by side along the first direction, and gaps between the second metal lines define hollow out parts of the second hollow out pattern; and
- the third hollow out pattern comprises a plurality of third metal lines, which each extend along the third direction and are arranged side by side along the first direction, and gaps between the third metal lines define the hollow out parts of the third hollow out pattern.

6. The antenna of claim 5, wherein a distance between any two adjacent ones of the first metal lines is the same as a distance between any two adjacent ones of the second metal lines; and an orthographic projection of each of the first metal lines on the dielectric layer is covered by an orthographic projection of an extension line of one of the second metal lines on the dielectric layer.

7. The antenna of claim 5, wherein the first direction is the same as the third direction.

8. The antenna of claim 5, wherein the first hollow out pattern further comprises a plurality of fourth metal lines intersecting the first metal lines, and the fourth metal lines each extend along a fourth direction and are arranged side by side along the second direction; and the third hollow out pattern further comprises a plurality of fifth metal lines intersecting the third metal lines, and the fifth metal lines each extend along the fourth direction and are arranged side by side along the second direction.

9. The antenna of claim 8, wherein the fourth direction is the same as the second direction.

10. The antenna of claim 8, wherein the second hollow out pattern further comprises a plurality of sixth metal lines intersecting the first metal lines, and the sixth metal lines each extend along the fourth direction and are arranged side by side along the second direction.

11. The antenna of claim 10, wherein the radiation patch further comprises a third radiation edge and a fourth radiation edge, which each extend along the second direction and are arranged side by side along the first direction; the opening further comprises a third opening and a fourth opening, which each extend along the second direction and are arranged side by side along the first direction; an orthographic projection of the third radiation edge on the dielectric layer penetrates through an orthographic projection of the third opening on the dielectric layer; and an orthographic projection of the fourth radiation edge on the dielectric layer penetrates through an orthographic projection of the fourth opening on the dielectric layer.

12. The antenna of claim 11, wherein a length of the third opening is not less than a length of the third radiation edge; and/or a length of the fourth opening is not less than a length of the fourth radiation edge.

13. The antenna of claim 1, wherein the reference electrode layer and the radiation patch each are circular or oval in profile;
- the reference electrode layer comprises a plurality of seventh metal lines concentrically arranged in circles and a plurality of eighth metal lines radiating from a center of the reference electrode layer to an edge of the reference electrode layer, at least a portion of the eighth metal lines each are disconnected at positions of the seventh metal lines to define the opening; and the radiation patch comprises a plurality of ninth metal lines concentrically arranged in circles and a plurality of tenth metal lines radiating from a center of the radiation patch to an edge of the radiation patch.

14. The antenna of claim 13, wherein the opening comprises a first opening and a second opening; and the first opening and the second opening forms a centrosymmetric pattern.

15. The antenna of claim 1, wherein the reference electrode layer further comprises a filling medium filled in the opening.

16. The antenna of claim 1, wherein the dielectric layer comprises a first dielectric sub-layer, a first adhesive layer, a second dielectric sub-layer, a second adhesive layer and a third dielectric sub-layer, which are sequentially stacked, a surface of the third dielectric sub-layer away from the second adhesive layer serves as the first surface of the dielectric layer, and a surface of the first dielectric sub-layer away from the first adhesive layer serves as the second surface of the dielectric layer, or a surface of the third dielectric sub-layer close to the second adhesive layer serves as the first surface of the dielectric layer, and a surface of the first dielectric sub-layer close to the first adhesive layer serves as the second surface of the dielectric layer.

17. An antenna system, comprising at least one antenna of claim 1, the antenna system further comprising:

a transceiving element configured to transmit or receive a signal;

a radio frequency transceiver connected to the transceiving element, and configured to modulate a signal transmitted from the transceiving element, or configured to demodulate a signal received by the antenna and then transmit the signal to the transceiving element;

a signal amplifier connected to the radio frequency transceiver, and configured to increase a signal-to-noise ratio of a signal output by the radio frequency transceiver or the signal received by the antenna;

a power amplifier connected to the radio frequency transceiver, and configured to amplify power of the signal output by the radio frequency transceiver or the signal received by the antenna; and a filtering element connected to the signal amplifier, the power amplifier and the antenna, and configured to filter a signal received and then transmit the signal filtered to the antenna, or configured to filter the signal received by the antenna.

18. A method for manufacturing an antenna, comprising:

providing a dielectric layer;

forming a pattern comprising a reference electrode layer on a second surface of the dielectric layer by a patterning process, wherein an opening is formed in the reference electrode layer; and forming a pattern comprising a radiation patch on a first surface of the dielectric layer by a patterning process, wherein an orthographic projection of at least a part of a radiation edge of the radiation patch on the first surface is located within an orthographic projection of the opening on the first surface, wherein the pattern comprising the reference electrode layer and the pattern comprising the radiation patch are formed so that the reference electrode layer has a middle area and a peripheral area surrounding the middle area, the opening penetrates through at least a part of a boundary line between the middle area and the peripheral area, an orthographic projection of the radiation patch on the first surface covers an orthographic projection of the middle area of the reference electrode layer on the first surface, the reference electrode layer comprises a first hollow out pattern in the middle area and a second hollow out pattern in the peripheral area, and the radiation patch comprises a third hollow out pattern.

19. The method of claim 18, wherein the dielectric layer comprises a first dielectric sub-layer, a first adhesive layer, a second dielectric sub-layer, a second adhesive layer and a third dielectric sub-layer, which are sequentially stacked; and the method comprises:

providing the first dielectric sub-layer;

forming the pattern comprising the reference electrode layer on the first dielectric sub-layer by a patterning process;

coating the first adhesive layer on a side of the first dielectric sub-layer away from the reference electrode layer, forming the second dielectric sub-layer on the first adhesive layer, forming the second adhesive layer on a surface of the second dielectric sub-layer away from the first adhesive layer, and forming the third dielectric sub-layer on the second adhesive layer; and forming the pattern comprising the radiation patch on the third dielectric sub-layer by a patterning process, or the method comprises:

providing the first dielectric sub-layer;

forming the pattern comprising the reference electrode layer on the first dielectric sub-layer by a patterning process;

providing the third dielectric sub-layer;

forming the pattern comprising the radiation patch on the third dielectric sub-layer by a patterning process; and providing a second dielectric sub-layer, bonding a side of the first dielectric sub-layer, on which the reference electrode layer is formed, to the second dielectric sub-layer by the first adhesive layer, and bonding a side of the third dielectric sub-layer, on which the radiation patch is formed, to the second dielectric sub-layer.

20. An antenna, comprising:

a dielectric layer having a first surface and a second surface which are oppositely disposed along a thickness direction of the dielectric layer;

a radiation patch disposed on the first surface of the dielectric layer; and a reference electrode layer disposed on the second surface of the dielectric layer and having an orthographic projection on the second surface at least partially overlapping an orthographic projection of the radiation patch on the second surface; wherein the reference electrode layer has an opening penetrating therethrough along a thickness direction of the reference electrode layer, and an orthographic projection of at least a part of a radiation edge of the radiation patch on the first surface is located within an orthographic projection of the opening on the first surface, wherein the reference electrode layer and the radiation patch each are circular or oval in profile;

the reference electrode layer comprises a plurality of seventh metal lines concentrically arranged in circles and a plurality of eighth metal lines radiating from a center of the reference electrode layer to an edge of the reference electrode layer, at least a portion of the eighth metal lines each are disconnected at positions of the seventh metal lines to define the opening; and the radiation patch comprises a plurality of ninth metal lines concentrically arranged in circles and a plurality of tenth metal lines radiating from a center of the radiation patch to an edge of the radiation patch.

* * * * *